United States Patent
Flaks et al.

(10) Patent No.: US 8,884,984 B2
(45) Date of Patent: Nov. 11, 2014

(54) FUSING VIRTUAL CONTENT INTO REAL CONTENT

(75) Inventors: Jason Flaks, Redmond, WA (US); Avi Bar-Zeev, Redmond, WA (US); Jeffrey Neil Margolis, Seattle, WA (US); Chris Miles, Seattle, WA (US); Alex Aben-Athar Kipman, Redmond, WA (US); Andrew John Fuller, Redmond, WA (US); Bob Crocco, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 12/905,952

(22) Filed: Oct. 15, 2010

(65) Prior Publication Data

US 2012/0092328 A1     Apr. 19, 2012

(51) Int. Cl.
| | | |
|---|---|---|
| G09G 5/00 | (2006.01) | |
| G06F 3/01 | (2006.01) | |
| G06F 3/00 | (2006.01) | |
| G06K 9/00 | (2006.01) | |
| G06T 19/00 | (2011.01) | |
| G02B 27/01 | (2006.01) | |

(52) U.S. Cl.
CPC ........ *G02B 27/017* (2013.01); *G02B 2027/014* (2013.01); *G06F 3/012* (2013.01); *G06F 3/005* (2013.01); *G06K 9/00664* (2013.01); *G06T 19/006* (2013.01); *G02B 2027/0127* (2013.01)
USPC .......................................... 345/629; 345/419

(58) Field of Classification Search
CPC .......... G06T 19/006; G06T 7/20; G06T 15/20
USPC .................................................. 345/419, 629
See application file for complete search history.

(56) References Cited

U.S. PATENT DOCUMENTS

| | | |
|---|---|---|
| 6,330,281 B1 | 12/2001 | Mann et al. |
| 6,466,207 B1 | 10/2002 | Gortler et al. |
| 6,525,731 B1 | 2/2003 | Suits et al. |
| 6,674,877 B1 | 1/2004 | Jojic et al. |
| 6,795,090 B2 | 9/2004 | Cahill et al. |
| 6,956,566 B2 | 10/2005 | Gelb |
| 7,372,977 B2 | 5/2008 | Fujimura et al. |
| 7,583,275 B2 | 9/2009 | Neumann et al. |
| 7,605,826 B2 | 10/2009 | Sauer |

(Continued)

OTHER PUBLICATIONS

Agarwal, et al., "Occlusion Culling for Fast Walkthrough in Urban Areas", Sep. 19, 2000, 2 pages.

(Continued)

*Primary Examiner* — Kee M Tung
*Assistant Examiner* — Peter Hoang
(74) *Attorney, Agent, or Firm* — Micah Goldsmith; Peter Taylor; Micky Minhas

(57) ABSTRACT

A system that includes a head mounted display device and a processing unit connected to the head mounted display device is used to fuse virtual content into real content. In one embodiment, the processing unit is in communication with a hub computing device. The system creates a volumetric model of a space, segments the model into objects, identifies one or more of the objects including a first object, and displays a virtual image over the first object on a display (of the head mounted display) that allows actual direct viewing of at least a portion of the space through the display.

10 Claims, 13 Drawing Sheets

(56) References Cited

U.S. PATENT DOCUMENTS

| | | | |
|---|---|---|---|
| 7,812,815 | B2 | 10/2010 | Banerjee et al. |
| 7,957,584 | B2 | 6/2011 | Najafi et al. |
| 2004/0239670 | A1 | 12/2004 | Marks |
| 2008/0024597 | A1 | 1/2008 | Yang et al. |
| 2008/0150965 | A1 | 6/2008 | Bischoff et al. |
| 2008/0246759 | A1 | 10/2008 | Summers |
| 2008/0284864 | A1* | 11/2008 | Kotake et al. ............. 348/222.1 |
| 2009/0221368 | A1 | 9/2009 | Yen et al. |
| 2010/0083140 | A1* | 4/2010 | Dawson et al. ............... 715/757 |
| 2010/0238161 | A1 | 9/2010 | Varga et al. |
| 2011/0075257 | A1 | 3/2011 | Hua et al. |
| 2011/0292076 | A1* | 12/2011 | Wither et al. ................ 345/632 |

OTHER PUBLICATIONS

"THX TruStudio Software Suite", THX.com [online], [retrieved on Jan. 30, 2012] Retrieved from the Internet: <URL:http://www.thx.com/consumer/thx-technology/thx-trustudio-software-suite/>, 6 pages.

Breen et al., "Interactive Occlusion and Collision of Real and Virtual Objects in Augmented Reality", Technical Report ECRC-95-02, 1995, European Computer-Industry Research Center GmbH, Munich, Germany, 22 pages.

Clayton, Steve, "HoloDesk-Direct 3D Interactions with a Situated See-Through Display", Microsoft Research, Oct. 19, 2011 [retrieved on Oct. 26, 2011], Retrieved from the Internet: <URL:http://blogs.technet.com/b/next/archive/2011/10/19/microsoft-research-shows-some-fresh-thinking-on-nui-and-touch-interface.aspx>, 173 pages.

Elmqvist, et al., "Employing Dynamic Transparency for 3D Occlusion Management: Design Issues and Evaluation", In Proceedings of Interact 11th IFIP TC 13 International Conference on Human-computer Interaction, Sep. 10-14, 2007, 14 pages.

Stackoverflow, "3D Audio Engine", stackoverflow.com [online], Q & A for professional and enthusiast programmers, Mar. 2009 [retrieved on Jan. 26, 2012] Retrieved from the Internet: <URL:http://stackoverflow.com/questions/700947/3d-audio-engine>, 4 pages.

Giesen, Fabian, "Efficient Compression and Rendering in a Client-Server setting," Thesis submitted to the Math and Science faculty of Rheinischen Friedrich-Wilhelms-Universitat in Bonn, Germany, May 2008, pp. 1-68, 68 pages.

Hughes, et al., "The Shared Imagination: Creative Collaboration in Augmented Virtuality", In Proceedings of Human Computer Interaction International, Jul. 22-27, 2005, 10 pages.

Kamat, et al., "Resolving Incorrect Visual Occlusion in Outdoor Augmented Reality Using TOF Camera and OpenGL Frame Buffer", In Proceedings of NSF Engineering Research and Innovation Conference, Jan. 4-7, 2011, 8 pages.

Koller et al, "Protected Interactive 3D Graphics Via Remote Rendering," International Conference on Computer Graphics and Interactive Techniques, Aug. 8-12, 2004, pp. 1-9, ACM, New York, NY, 9 pages.

"Sound Blaster Tactic3D Sigma", Creative.com [online], [retrieved on Jan. 30, 2012] Retrieved from the Internet: <URL: http://www.creative.com/soundblaster/tactic3d/sigma/>, 3 pages.

Olaiz, et al., "3D-Audio with CLAM and Blender's Game Engine", LinuxAudio.org, [retrieved Jan. 26, 2012], Retrieved from the Internet: <URL:http://lac.linuxaudio.org/2009/cdm/Thursday/05_Arumi/27.pdf>, 9 pages.

Pasman, et al., "Comparing Simplification and Image-Based Techniques for 3D Client-Server Rendering Systems," Institute of Electrical and Electronics Engineers—Transactions on Visualization and Computer Graphics, Apr. 2003, pp. 226-240, vol. 9, Issue 2, IEEE Educational Activities Department, Piscataway, NJ, 47 pages.

Quax, et al, "On the Applicability of Remote Rendering of Networked Virtual Environments on Mobile Devices," Proceedings of the 2006 International Conference on Systems and Networks Communication, Oct. 29-Nov. 3, 2006, pp. 1-6, IEEE, Washington, DC, 6 pages.

Ryu, et al., "Real-Time Occlusion Culling for Augmented Reality," Proceedings of Joint Workshop on Frontiers of Computer Vision (FCV'10), pp. 498-503, Hiroshima, Japan, Feb. 4-6, 2010, Retrieved from the Internet: <URL: https://sites.google.com/site/ryuseun/research-paper>, 6 pages.

Smit, et al, "An Image-Warping Architecture for VR: Low Latency versus Image Quality," The 2009 Institute of Electrical and Electronics Engineers Virtual Reality Conference, Mar. 14-18, 2009, pp. 27-34, IEEE, New York, NY, 8 pages.

Rolland et al., "Optical Versus Video See-Through Head-Mounted Displays in Medical Visualization," Presence: Teleoperators and Virtual Environments, vol. 9, Issue 3, Jun. 2000, pp. 287-309, MIT Press, Cambridge, MA, USA, 23 pages.

U.S. Appl. No. 13/443,368, filed Apr. 10, 2012.

Billinghurst, Mark, and Hirokazu Kato, "Collaborative Mixed Reality," Proceedings of the First International Symposium on Mixed Reality held on Mar. 9-11, 1999 in Yokohama, Japan, Mixed Reality—Merging Real and Virtual Worlds, Jun. 1999, pp. 261-284, Springer Verlag, Berlin, Germany.

Encarnacao, et al., "Walk-up VR: Virtual Reality beyond Projection Screens," Institute of Electrical and Electronics Engineers Computer Graphics and Applications, Nov. 2000, pp. 19-23, vol. 20, Issue 5, IEEE Computer Society Press, Los Alamitos, CA, USA.

Lok, et al., "Incorporating Dynamic Real Objects into Immersive Virtual Environments," Proceedings of the 2003 symposium on Interactive 3D graphics, Apr. 27-30, 2003, pp. 1-11, Association for Computing Machinery, Monterey, California, USA.

Chinese Office Action dated Nov. 27, 2013, partial English translation and English Summary of Office Action, Chinese Patent Application No. 201110328560.0.

Chinese Office Action dated Jul. 21, 2014, Chinese Patent Application No. 201110328560.0.

* cited by examiner

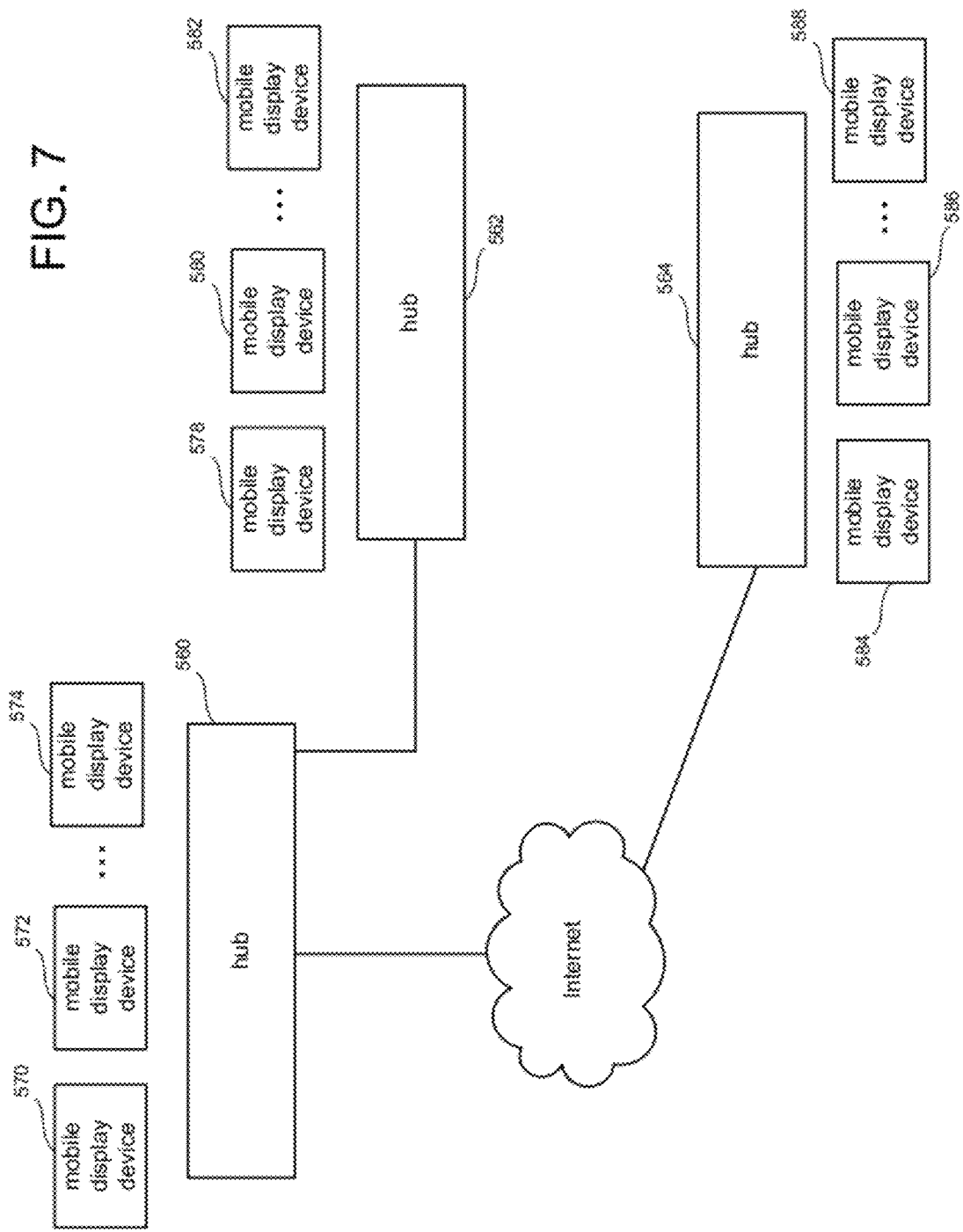

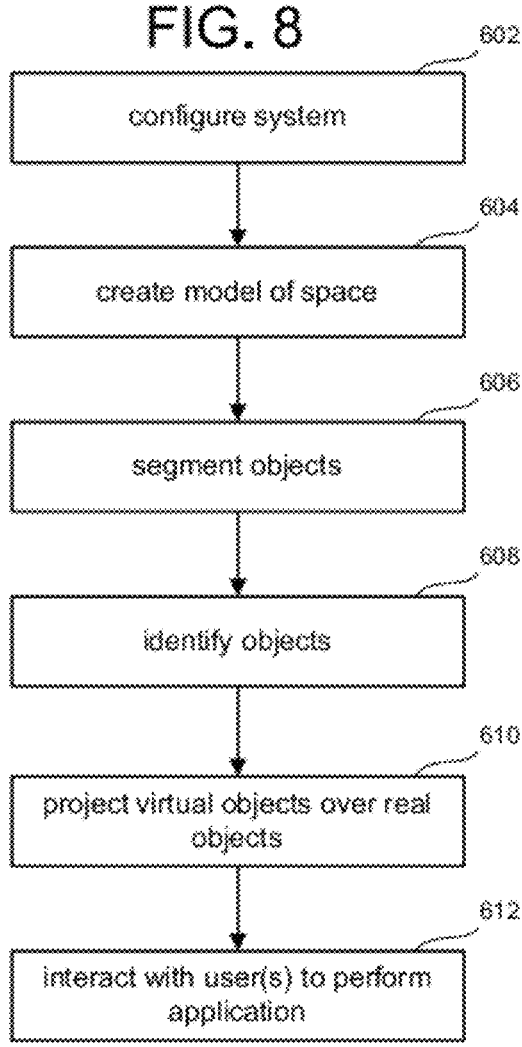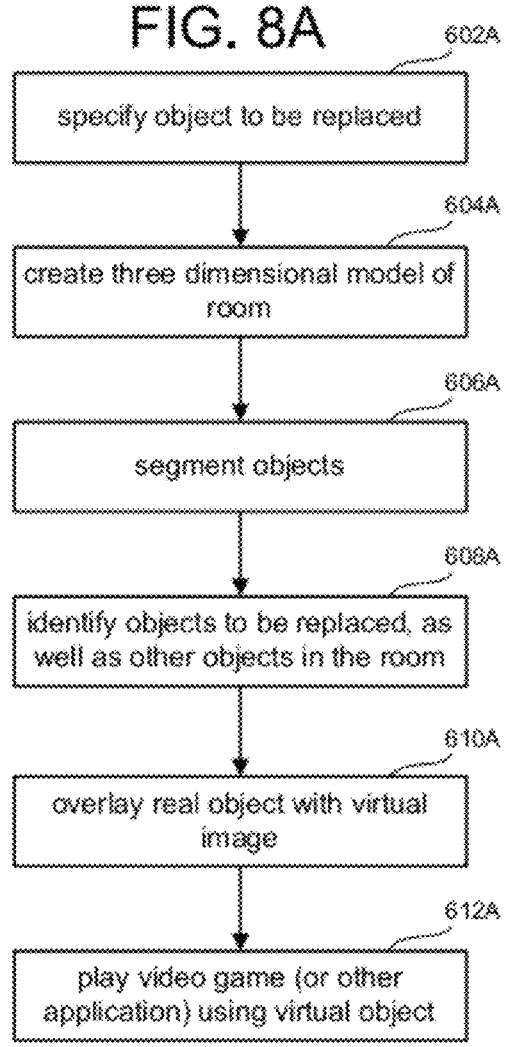

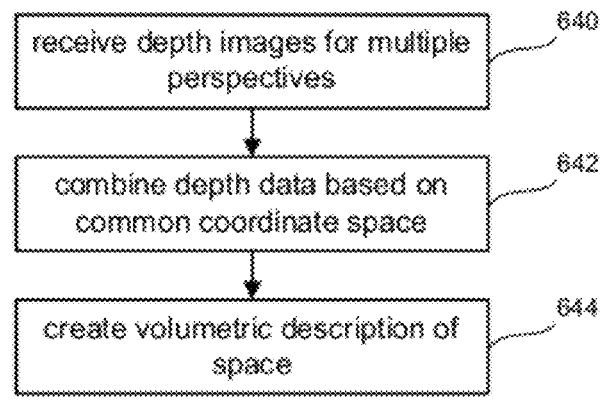
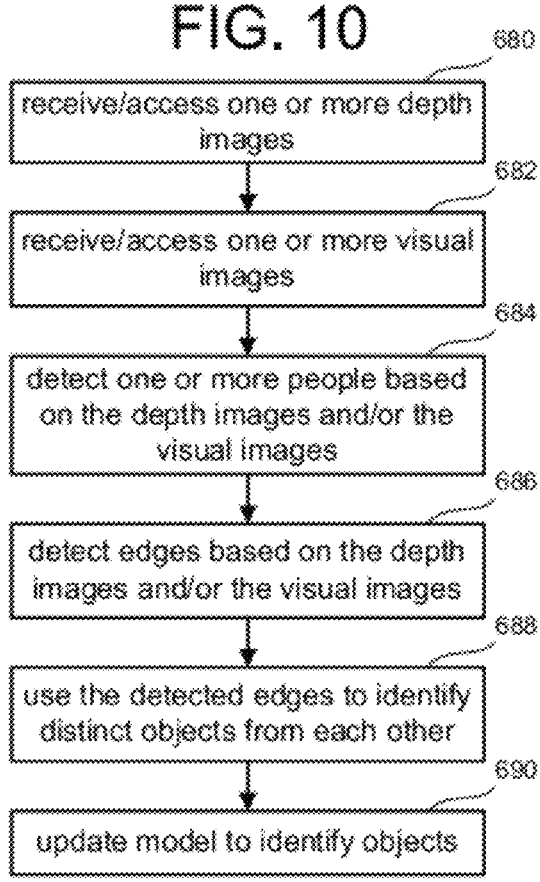

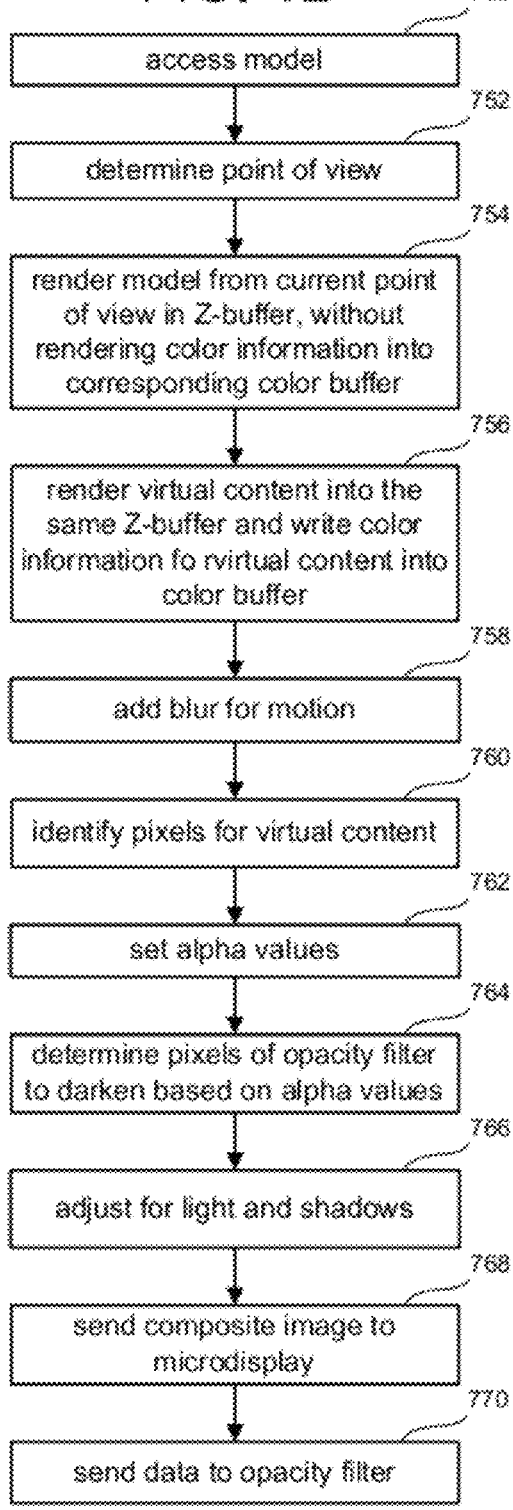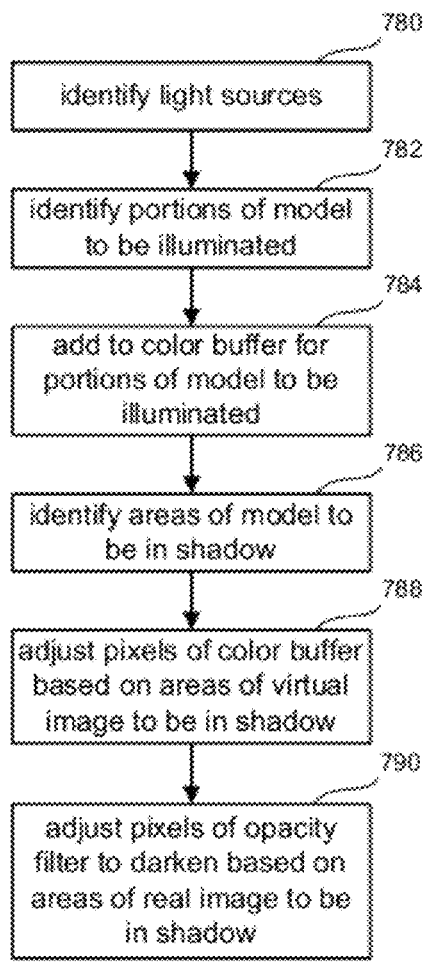

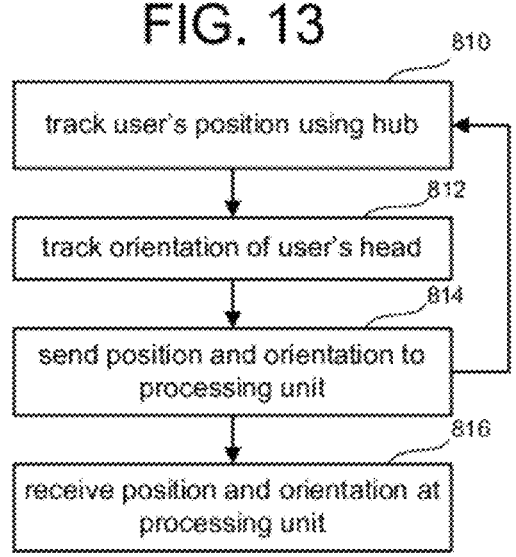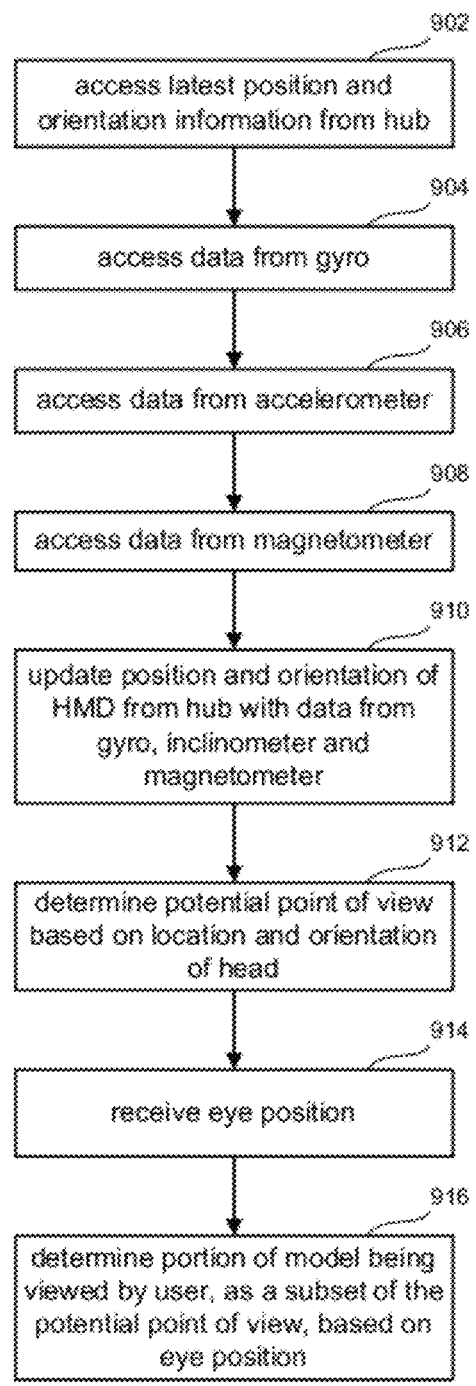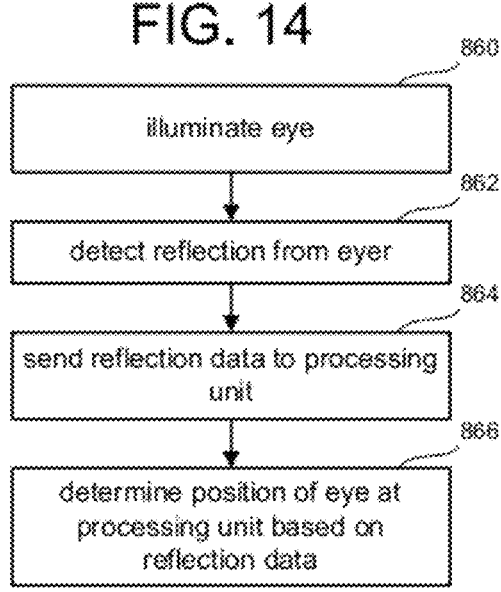

FUSING VIRTUAL CONTENT INTO REAL CONTENT

BACKGROUND

Augmented reality is a technology that allows virtual imagery to be mixed with a real world physical environment. For example, an augmented reality system can be used to insert an image of a dinosaur into a user's view of a room so that the user sees a dinosaur walking in the room.

One of the harder problems to solve with augmented reality is the ability to overlay virtual objects on top of real objects. For example, it may be desired to mask a real object and make it appear as something else. Alternatively, it may be desired to add a new image into a scene that appears to be part of the scene, requiring the new image to block the view of all or a part of a real object in the scene.

Masking out real objects with virtual images can be complicated.

SUMMARY

The technology described herein provides a system for fusing virtual content with real content such that an image of a virtual object may block all or part of the view of the real object. One or more sensors are used to scan the environment and build a model of the scanned environment. Using the model, the system adds a virtual image to the user's view of the environment at a location that is in reference to a real world object. For example, the system can be configured to create a model of a room and add a virtual image of an imaginary boulder to replace a real coffee table in the room. The user wears a head mounted display device (or other suitable apparatus) that has a display element. The display element allows the user to look through the display element at the room, thereby allowing actual direct viewing of the room through the display element. The display element also provides the ability to project virtual images into the field of view of the user such that the virtual images appear to be in the room. The system automatically tracks where the user is looking so that the system can determine where to insert the virtual image of the boulder, for example, in the field of view of the user. Once the system knows where to project the virtual image, the image is projected using the display element.

In some embodiments, a filter can be used, in alignment with the display element, to selectively block light to the display element. This allows the system to darken the area where the virtual image is to be projected, thereby making it easier to see the virtual image and harder to see the real world object(s) behind the virtual image. In the above example, the filter would be used to make the coffee table harder to see so that when the boulder is projected over the coffee table, the viewer sees the boulder well, but cannot see the coffee table well (or at all).

One embodiment includes creating a volumetric model of a space, segmenting the model into objects, identifying one or more of the objects including a first object, and automatically displaying a virtual image over the first object on a display that allows actual direct viewing of at least a portion of the space through the display.

One example implementation includes a head mounted display device and a processing unit in communication with the head mounted display device. The head mounted display device includes a display that allows actual direct view of a first object through the display, an opacity filter aligned with the display so that light passing through the opacity filter also passes through the display, inertial sensors that sense orientation information for the head mounted display device, a first communication interface, and one or more control circuits in communication with the display, opacity filter, inertial sensors and the first communication interface. The processing unit includes a second communication interface that is in communication with the first communication interface and one or more control circuits in communication with the head mounted display device via the first communication interface and the second communication interface to automatically display a virtual image on the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a block diagram depicting a multi-user system that can fuse virtual content with real content.

FIG. 8 is a flow chart describing one embodiment of a process for fusing virtual content with real content.

FIG. 8A is a flow chart describing one embodiment of a process for fusing virtual content with real content.

FIG. 9 is a flow chart describing one embodiment of a process for creating a model of a space.

FIG. 10 is a flow chart describing one embodiment of a process for segmenting the model into objects.

FIG. 12 is a flow chart describing one embodiment of a process for projecting virtual objects over real objects.

FIG. 12A is a flow chart describing one embodiment of a process for adjusting what is displayed based on light sources and shadows.

FIG. 13 is a flow chart describing one embodiment of a process for the hub tracking the position and orientation of a user and/or the head mounted display unit.

FIG. 14 is a flow chart describing one embodiment of a process for tracking the position of an eye.

FIG. 15 is a flow chart describing one embodiment of a process for determining the point of view of a user.

DETAILED DESCRIPTION

A system is disclosed herein that can fuse virtual objects with real objects. In one embodiment, the system includes a head mounted display device and a processing unit in communication with the head mounted display device. The head mounted display device includes a display that allows actual a direct view of real world objects through the display. The system can project virtual images on the display that are viewable by the person wearing the head mounted display device while that person is also viewing real world objects through the display. Various sensors are used to detect position and orientation in order to determine where to project the virtual images.

One or more of the sensors are used to scan the neighboring environment and build a model of the scanned environment. In one embodiment, the scan of the environment may also include determining the location of light sources, and reflectivity of surfaces, which would enable the system to add appropriate shadows and reflections on real surfaces. That is, the system will map lighting and reflectivity of surfaces for reflections and shadows The model is segmented into objects and the real world objects are identified with respect to the model. Using the model, a virtual image is added to a view of the model at a location that is in reference to a real world object that is part of the model. The system automatically tracks where the user is looking so that the system can figure out the user's field of view through the display of the head mounted display device. The user can be tracked using any of various sensors including depth sensors, image sensors, inertial sensors, eye position sensors, etc. Once the system knows the user's field of view, the system can figure out where the virtual image should be projected by the display of the head mounted display device. The image is then rendered by sizing and orienting the virtual image and rendering that sized/oriented image on the display of the head mounted display device. In some embodiments, the virtual image can be changed to account for occlusions.

Some implementations of the system described herein include a filter, in alignment with the display of the head mounted display device, to selectively block light to the display. This allows the system to make the area where the virtual image is to be projected to be darker, thereby making it easier to see the virtual image and harder to see the real world object(s) behind the virtual image.

Figure 1:
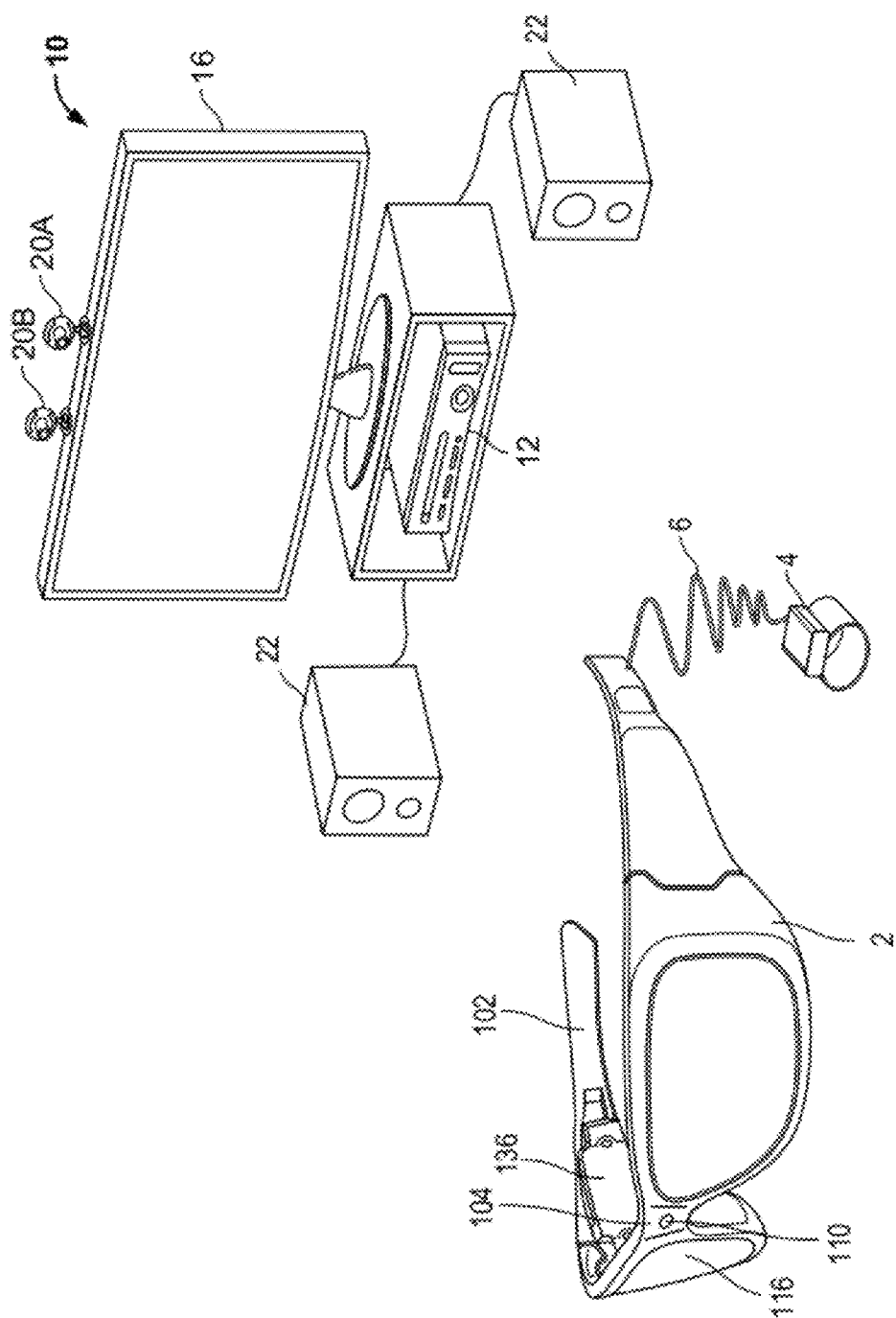
FIG. 1 is a block diagram depicting example components of one embodiment of the system for fusing virtual content into real content.

FIG. 1 is a block diagram depicting example components of one embodiment of a system 10 for fusing virtual content into real content. System 10 includes head mounted display device 2 in communication with processing unit 4 via wire 6. In other embodiments, head mounted display device 2 communicates with processing unit 4 via wireless communication. Head mounted display device 2, which in one embodiment is in the shape of glasses, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is worn on the user's wrist and includes much of the computing power used to operate head mounted display device 2. Processing unit 4 communicates wirelessly (e.g., WiFi, Bluetooth, infra-red, or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further include one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the entire relevant space is viewed by the capture device.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers 22.

Hub computing device 10, with capture devices 20A and 20B, may be used to recognize, analyze, and/or track human (and other types of) targets. For example, a user wearing head mounted display device 2 may be tracked using the capture devices 20A and 20B such that the gestures and/or movements of the user may be captured to animate an avatar or on-screen character and/or may be interpreted as controls that may be used to affect the application being executed by hub computing system 12.

Figure 2:
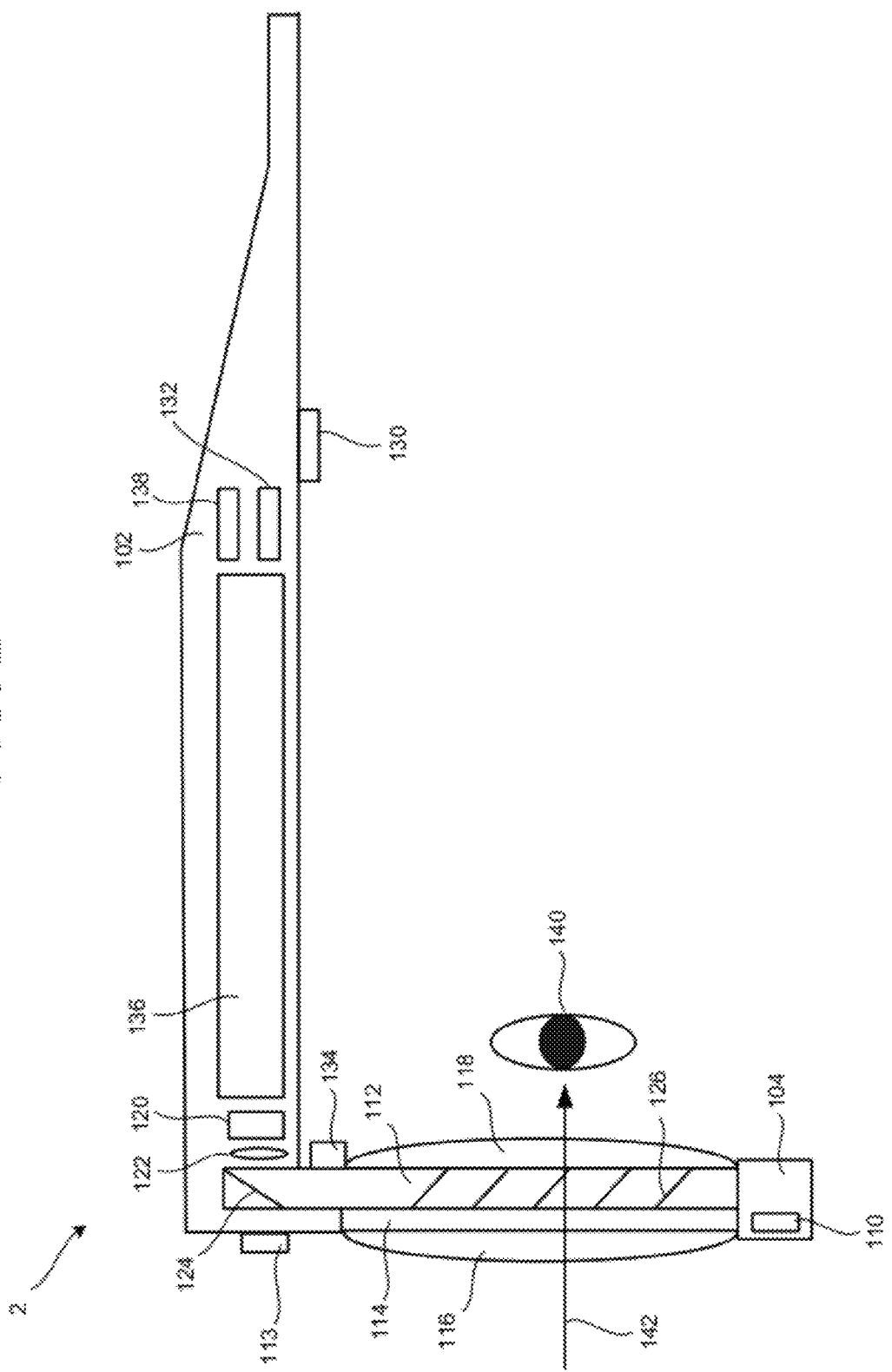
FIG. 2 is a top view of a portion of one embodiment of a head mounted display unit.

FIG. 2 depicts a top view of a portion of head mounted display device 2, including a portion of the frame that includes temple 102 and nose bridge 104. Only the right side of head mounted display device 2 is depicted. Built into nose bridge 104 is a microphone 110 for recording sounds and transmitting that audio data to processing unit 4, as described below. At the front of head mounted display device 2 is room facing video camera 113 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside lightguide optical element 112. Opacity filter 114 filters out natural light (either on a per pixel basis or uniformly) to enhance the contrast of the virtual imagery. Lightguide optical element 112 channels artificial light to the eye. More detailed of opacity filter 114 and lightguide optical element 112 is provided below.

Mounted to or inside temple 102 is an image source, which (in one embodiment) includes microdisplay 120 for projecting a virtual image and lens 122 for directing images from microdisplay 120 into lightguide optical element 112. In one embodiment, lens 122 is a collimating lens.

Control circuits 136 provides various electronics that support the other components of head mounted display device 2. More details of control circuits 136 are provided below with respect to FIG. 3. Inside, or mounted to temple 102, are ear phones 130, inertial sensors 132 and temperature sensor 138. In one embodiment inertial sensors 132 include a three axis magnetometer 132A, three axis gyro 132B and three axis accelerometer 132C (See FIG. 3). The inertial sensors are for sensing position, orientation, and sudden accelerations of head mounted display device 2.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DGP), liquid crystal on silicon (LCOS) and Mirasol® display technology from Qualcomm, inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Lightguide optical element 112 transmits light from microdisplay 120 to the eye 140 of the user wearing head mounted display device 2. Lightguide optical element 112 also allows light from in front of the head mounted display device 2 to be transmitted through lightguide optical element 112 to eye 140, as depicted by arrow 142, thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising lightguide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112. When the head mounted display device has two light guide optical elements, each eye can have its own microdisplay 120 that can display the same image in both eyes or different images in the two eyes. In another embodiment, there can be one lightguide optical element which reflects light into both eyes.

Opacity filter 114, which is aligned with lightguide optical element 112, selectively blocks natural light, either uniformly or on a per-pixel basis, from passing through lightguide optical element 112. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

An opacity filter such as an LCD has generally not been used with a see-through lens as described herein because at this near distance to the eye it can be out of focus. However, in some cases, this result can be desirable. A user sees the virtual image with crisp color graphics via the normal HMD display using additive color, which is designed to be in focus. The LCD panel is placed "behind" this display such that a fuzzy black border surrounds any virtual content, making it as opaque as desired. The system converts the flaw of natural blurring to expediently obtain the feature of anti-aliasing and bandwidth reduction. These are a natural result of using a lower-resolution and out-of-focus image. There is an effective smoothing of the digitally-sampled image. Any digital image is subject to aliasing, where the discrete nature of the sampling causes errors against the naturally analog and continuous signal, around the wavelengths of light. Smoothing means visually closer to the ideal analog signal. Although information lost to the low resolution is not recovered, the resulting errors are less noticeable.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Figure 2A:
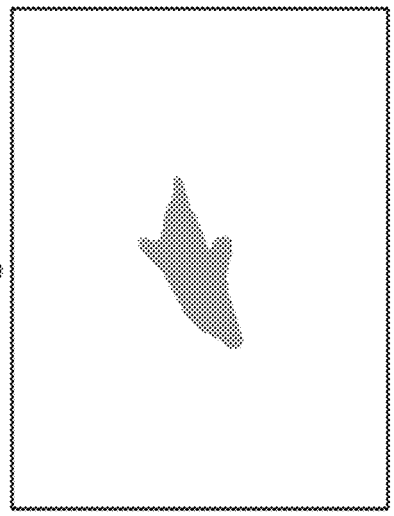
FIGS. 2A-2E provide example images that illustrate the operation of an opacity filer.
Figure 2B:
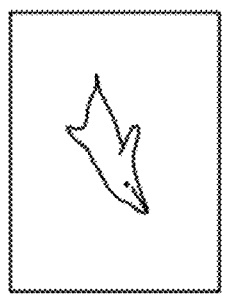
Figure 2C:
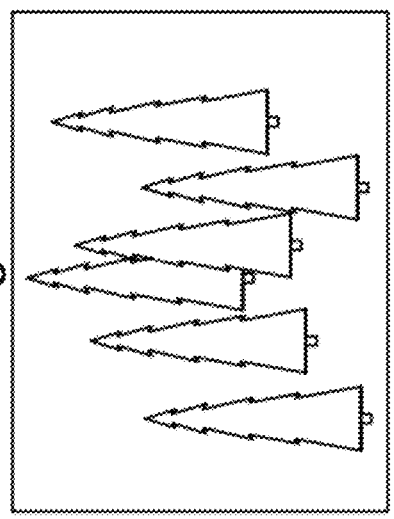
Figure 2D:
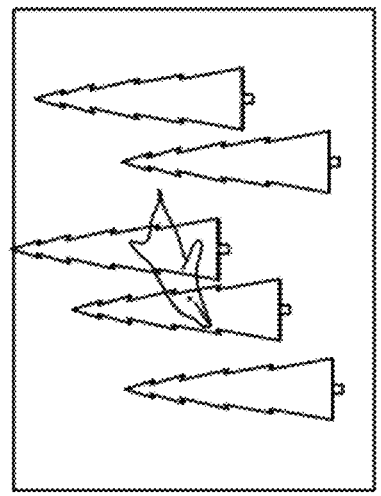
Figure 2E:
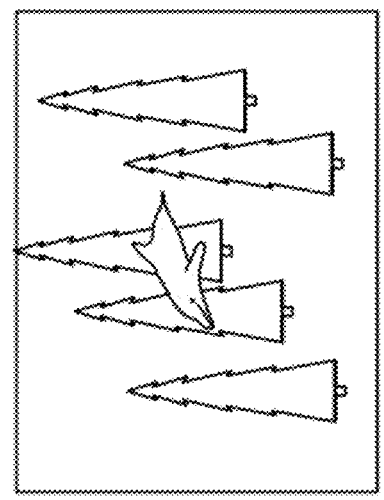

To provide an example of the operation of the opacity filter, FIG. 2A depicts an example real-world scene of a forest that is visible to a human eye looking through head mounted display device 2. FIG. 2B depicts a virtual image, which in this case is a dolphin. FIG. 2C depicts an example configuration of an opacity filter based on a shape of the virtual image of FIG. 2B. The opacity filter provides a darkened region of increased opacity where the dolphin will be rendered. An increased opacity generally refers to a darkening of pixels which can include allowing less light to pass through. A darkening to different grey levels (or black) in a monochrome scheme, or a darkening to different color levels in a color scheme can be used. FIG. 2D depicts the example image which is seen by a user and is the result of projecting the virtual image of the dolphin into the user's vision and using the opacity filter to remove light for the pixels corresponding to the position of the virtual image of the dolphin. As can be seen, the background is not visible through the dolphin. For comparison purposes, FIG. 2E shows the inserting of the virtual image into the real image without using the opacity filter. As can be seen, the real background can be seen through the virtual image of the dolphin.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2), which will include an eye tracking illumination device 134A and eye tracking camera 134B (see FIG. 3). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which is detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and us computer vision to find the image, much like as discussed above. Thus, although FIG. 2 shows one assembly with one IR emitter, the structure of FIG. 2 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 2 only shows half of the head mounted display device 2. A full head mounted display device would include another set of see through lenses, another opacity filter, another lightguide optical element, another microdisplay 136, another lens 122, room facing camera, eye tracking assembly, microdisplay, earphones, and temperature sensor.

Figure 3:
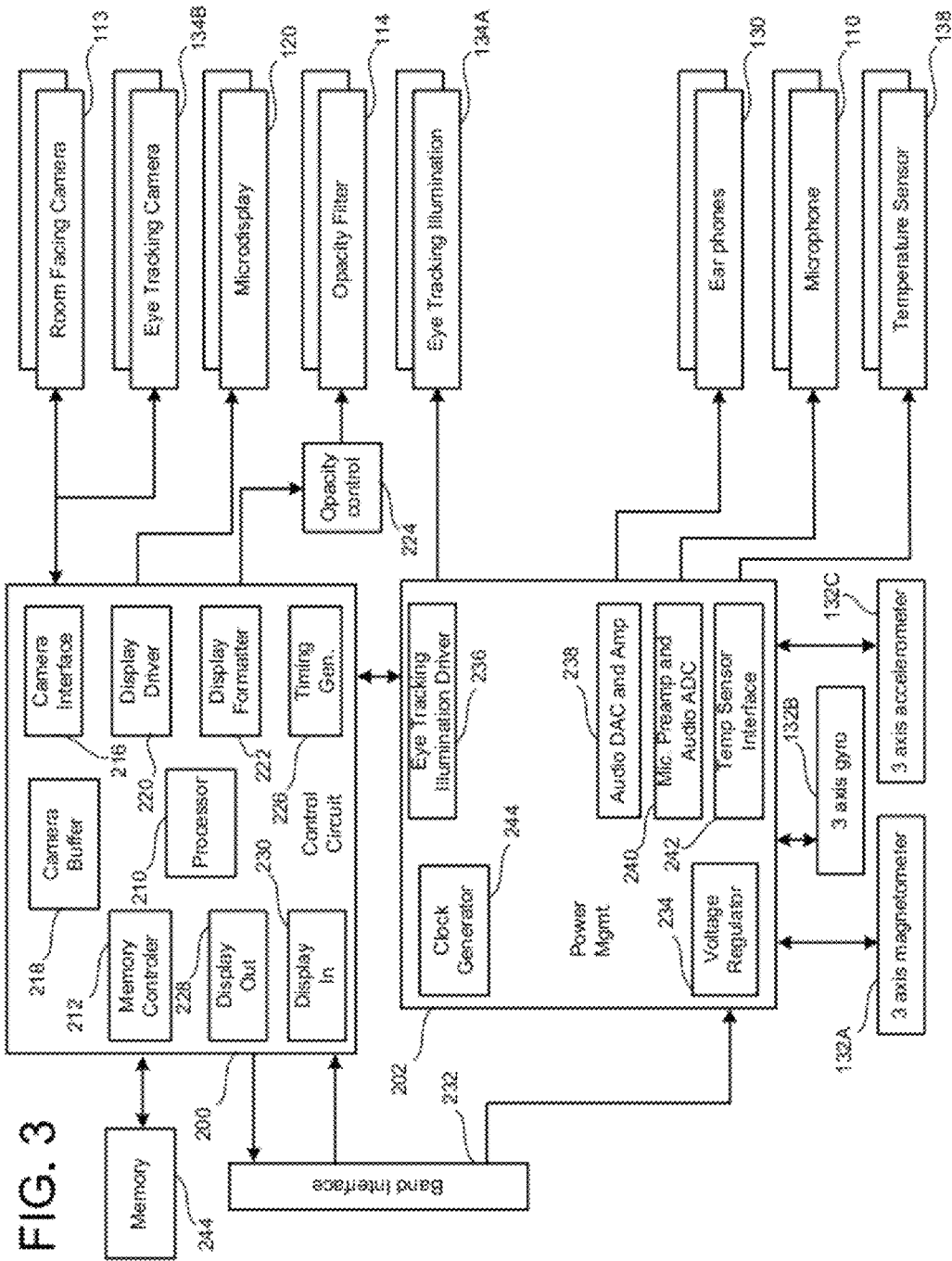
FIG. 3 is a block diagram of one embodiment of the components of a head mounted display unit.
Figure 4:
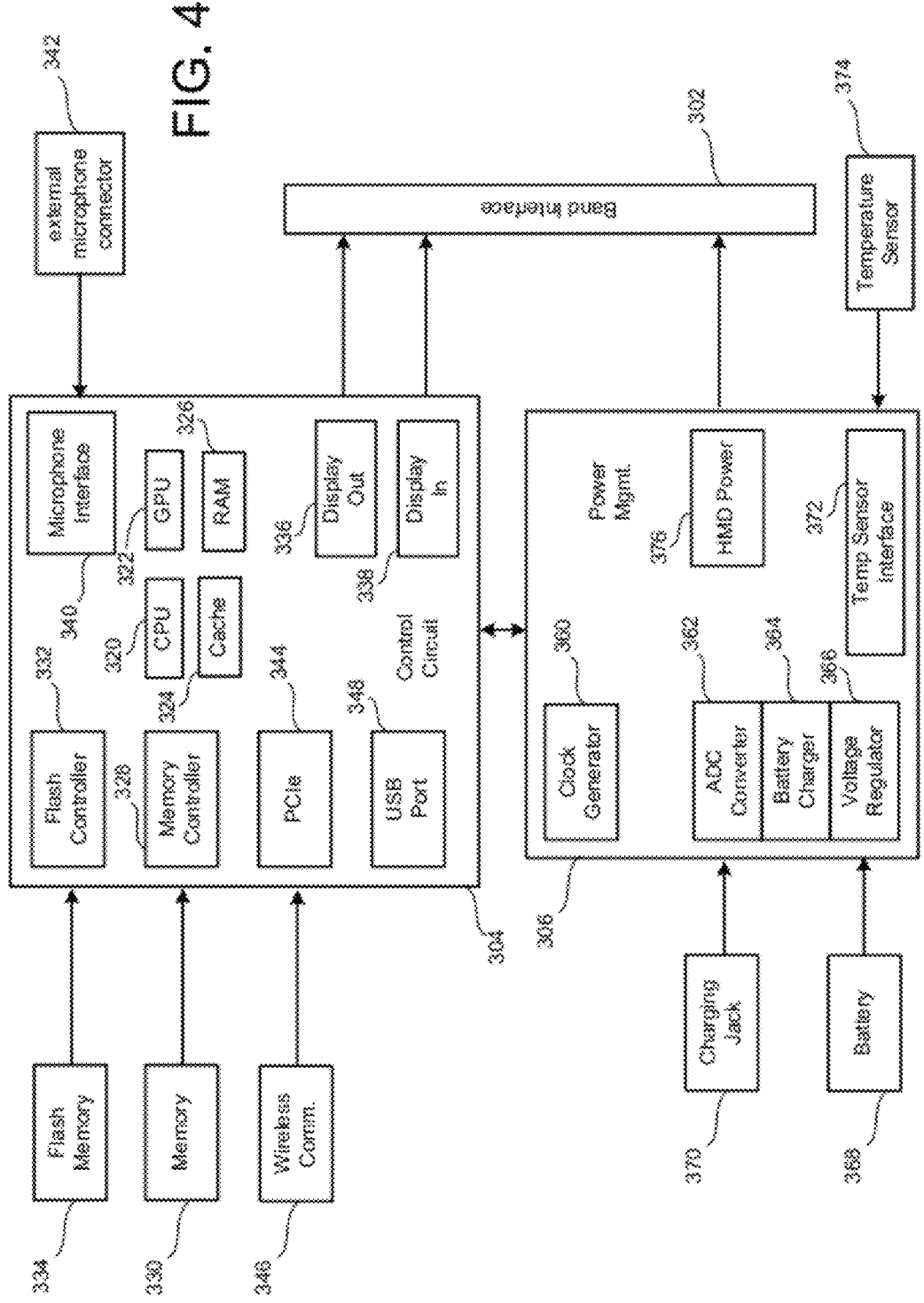
FIG. 4 is a block diagram of one embodiment of the components of a processing unit associated with a head mounted display unit.

FIG. 3 is a block diagram depicting the various components of head mounted display device 2. FIG. 4 is a block diagram describing the various components of processing unit 4. Head mounted display device 2, the components of which are depicted in FIG. 3, are used to provide the virtual image to the user by fusing that virtual image with the user's view of the real world. Additionally, the head mounted display device components of FIG. 3 include many sensors that track various conditions. Head mounted display device 2 will receive instructions about the virtual image from processing unit 4 and will provide the sensor information back to processing unit 4. Processing unit 4, the components of which are depicted in FIG. 3, will receive the sensory information from head mounted display device 2 and also from hub computing device 12 (See FIG. 1). Based on that information, processing unit 4 will determine where and when to provide a virtual image to the user and send instructions accordingly to the head mounted display device of FIG. 3.

Note that some of the components of FIG. 3 (e.g., rear facing camera 113, eye tracking camera 134B, micro display 120, opacity filter 114, eye tracking illumination 134A, earphones 130, and temperature sensor 138) are shown in shadow to indicate that there are two of each of those devices, one for the left side and one for the right side of head mounted display device 2. FIG. 3 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 200 are in communication with each other via a dedicated lines or one or more buses. In another embodiment, each of the components of control circuit 200 are in communication with processor 210. Camera interface 216 provides an interface to the two room facing cameras 113 and stores images received from the room facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room facing cameras 113 to the processing unit 4. Display in 230 is a buffer for receiving images such as a virtual image to be displayed on microdisplay 120. Display out 228 and display in 230 communicate with band interface 232 which is an interface to processing unit 4.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR lightsource for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three axis magnetometer 132A, three axis gyro 132B and three axis accelerometer 132C.

FIG. 4 is a block diagram describing the various components of processing unit 4. FIG. 4 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

The above-described system will be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to includes reflectivity and shadows. In one embodiment, head mounted display device 12, processing unit 4 and hub computing device 12 work together as each of the devices includes a subset of sensors that are used to obtain the data for determining where, when and how to insert the virtual images. In one embodiment, the calculations that determine where, how and when to insert a virtual image and performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 12.

In one example embodiment, hub computing device 12 will create a model of the environment that the user is in and track various moving objects in that environment. In addition, hub computing device 12 tracks the field of view of the head mounted display device 2 by tracking the position and orientation of head mounted display device 2. The model and the tracking information is provided from hub computing device 12 to processing unit 4. Sensor information obtained by head mounted display device 2 is transmitted to processing unit 4. Processing unit 4 then uses additional sensor information it receives from head mounted display device 2 to refine the field of view of the user and provide instructions to head mounted display device 2 on how, where and when to insert the virtual image.

Figure 5:
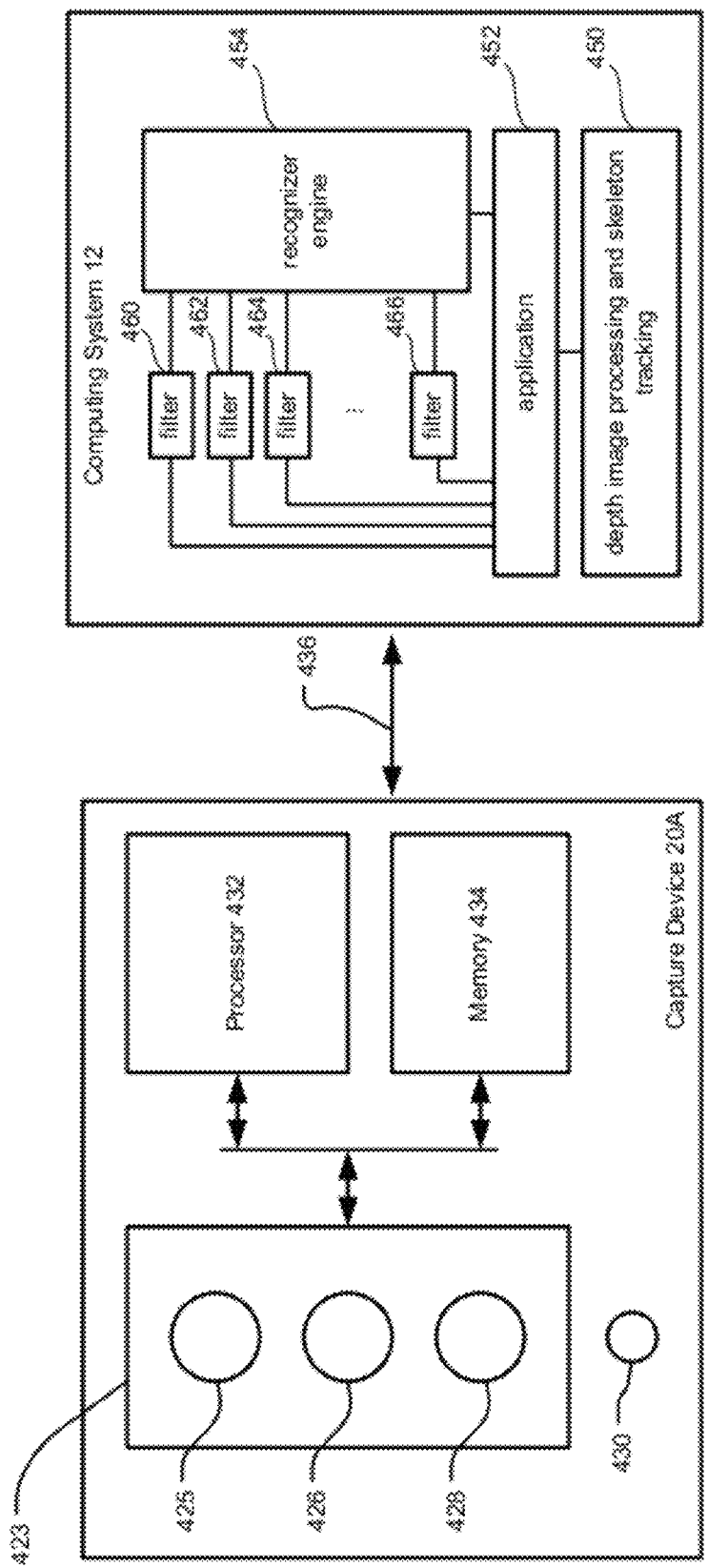
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A.

According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 453, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. Patent Applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Filters 460, 462, 464, . . . , 466 are loaded and implemented on top of the recognizer engine 454 and can utilize services provided by recognizer engine 454 to all filters 460, 462, 464, . . . , 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

Figure 6:
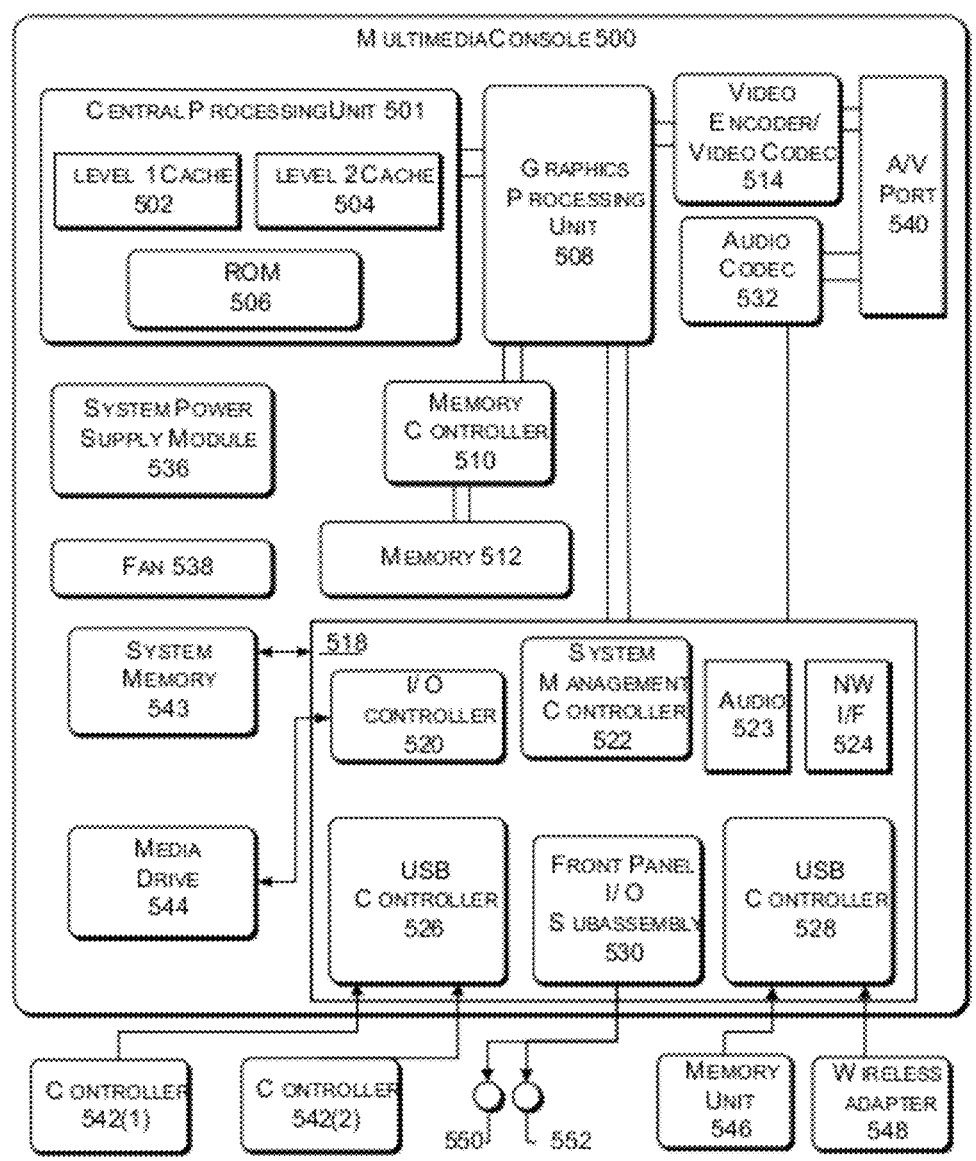
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

FIG. 1 depicts one head mounted display device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs, with each hub including one or more mobile display devices. The hubs can communicate with each other directly or via the Internet (or other networks). For example, FIG. 7 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display device 578, 580, . . . , 582. Hub 564 communicates with mobile display device 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

FIG. 8 is a flowchart describing one embodiment of a process for fusing virtual content into real content that is performed by the components discussed above. In step 602, the system is configured. For example, an operator or user of the system will indicate that a particular real world object should be replaced by a virtual object. In an alternative, an application (e.g., application 452 of FIG. 5) can configure the system to indicate that a particular real world object should be replaced by a virtual object. In other embodiments, the configuring the system will indicate that a particular virtual image (representing a virtual object) should be inserted into the environment, at a designated location, without necessarily replacing a real world object. Consider an example where an empty room is populated with virtual objects to turn the empty room into a virtual reality. In another example, an application running on hub computing system 12 will indicate that a particular virtual image (representing a virtual object) should be inserted into the environment as part of a video game or other process.

In step 604, the system will create a volumetric model of the space for which head mounted display device 2 is located. In one embodiment, for example, hub computing device 12 will use depth images from one or more depth cameras to create a three dimensional model of the environment for which head mounted display device 2 is located. In one embodiment, the creation of the model includes mapping lighting and reflectivity of surfaces for reflections and shadows In step 606, that model is segmented into one or more objects. For example, if hub computing device 12 creates a three dimensional model of a room, that room is likely to have multiple objects in it. Examples of objects that can be in a room include persons, chairs, tables, couches, etc. Step 606 includes determining distinct objects from each other. In step 608, the system will identify the objects. For example, hub computing device 12 may identify that a particular object is a table and another object is a chair. In step 610, the system will project a virtual object over a real object. That is, the system displays a virtual image over the first object in the field of view of the user while the user is looking through the head mounted display device 2. Thus, the virtual image will replace the real world object on a display device that allows actual direct viewing of at least a portion of the space through that display. The object being replaced can be a stationary object or a moving object. Additionally, the system can replace the entire object or only a portion of an object. For example, the system can be configured in step 602 to replace only a person's pants with a different pair of pants. Thus, step 610 would be projecting a virtual image of a new pair of pants over a person in the room, regardless of whether the person is moving or stationary. In step 612, the user of head mounted display device 2 will interact with an application running on hub computing device 12 (or another computing device) based on the virtual object being displayed in the head mounted display device 2. Each of the steps 604-610 will be described in more detail below.

FIG. 8A provides one example of an implementation of a process of FIG. 8. In step 602A (corresponding to step 602) the system is configured by specifying a real world object to be replaced by a virtual object. In step 604A (corresponding to step 604), hub computing device 12 will create a three dimensional model of the room that hub computing device 12 is located in. In step 606A (corresponding to step 606), the three dimensional model is segmented into a set of objects. In step 608A, hub computing device 12 will identify each of the objects from the segmentation step of 606A. Step 608A includes identifying the object that is to be replaced as well as other objects in the room. In step 610A (corresponding to step 610), head mounted display device 2 overlays the user's view of the real world object with the virtual image corresponding to the virtual object. For example, a coffee table in a room can be replaced by a boulder. In step 612A (corresponding to step 612), the user will play a video game using hub computing device 12 and the virtual object. For example, the user may play a video game that involves the boulder.

FIG. 9 is a flowchart describing one embodiment of a process for creating a model of the space. For example, the process of FIG. 9 is one example implementation of step 604 of FIG. 8. In step 640, hub computing system 12 receives one or more depth images for multiple perspectives of the space that head mounted display device is in. For example, hub computing device 12 can obtain depth images from multiple depth cameras, or multiple depth images from the same camera by pointing the camera in different directions or using a depth camera with a lens that allow a full view of the space for which a model will be built. In step 642, depth data from the various depth images are combined based on a common coordinate system. For example, if this system receives depth images from multiple cameras, the system will correlate the two images to have a common coordinate system (e.g., line up the images). In step 644, a volumetric description of the space is created using the depth data.

FIG. 10 is a flowchart describing one embodiment of a process for segmenting the model of the space in to objects. For example, the process of FIG. 10 is one example implementation of step 606 of FIG. 8. In step 680 of FIG. 10, the system will receive one or more depth images from one or more depth camera as discussed above. Alternatively, the system can access one or more depth images that it has already received. In step 682, the system will receive one or more visual images from the cameras described above. Alternatively, the system can access one or more visual images already received. In step 684, hub computing system will detect one or more people based on the depth images and/or visual images. For example, the system will recognize one or more skeletons. In step 686, hub computing device will detect edges within the model based on the depth images and/or the visual images. In step 688, hub computing device will use the detected edges to identify distinct objects from each other. For example, it is assumed that edges are boundaries between objects. In step 690, the model created using the process of FIG. 9 will be updated to show which portions of the model are associated with different objects.

Figure 11:
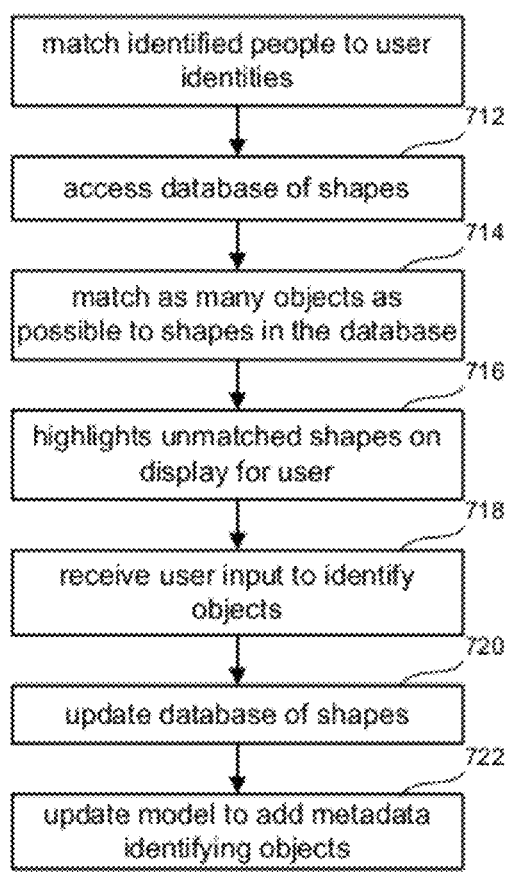
FIG. 11 is a flow chart describing one embodiment of a process for identifying objects.

FIG. 11 is a flowchart describing one embodiment of a process for identifying objects. For example, the process of FIG. 11 is one example implementation of step 608 of FIG. 8. In step 710, hub computing device 12 will match identified people to user identities. For example, the system may have user profiles that have visual images that can be matched to the images detected of the objects. Alternatively, a user profiles the can describe features of the person which can be match based on the depth images or visual images. In another embodiment, users may log into the system and hub computing device 12 can use the login process to identify a particular user and track that user throughout the interaction described herein. In step 712, hub computing device 12 will access the database of shapes. In step 714, hub computing device will match as many objects in the model to the shapes in the database. In step 716, those shapes that are unmatched will be highlighted and displayed to the user (e.g., using monitor 16). In step 718, hub computing device 12 will receive user input that identifies each (or a subset) of the shapes highlighted. For example, the user can use a keyboard, mouse, speech input, or other type of input to indicate what each unidentified shape is. In step 720, the database of shapes is updated based on the user input in step 718. In step 722, the model of the environment created in step 604, and updated in step 606, is further updated by adding metadata for each of the objects. The metadata identifies the object. For example the metadata may indicate that the particular object is a round shiny table, John Doe, green leather couch, etc.

Figure 11A:
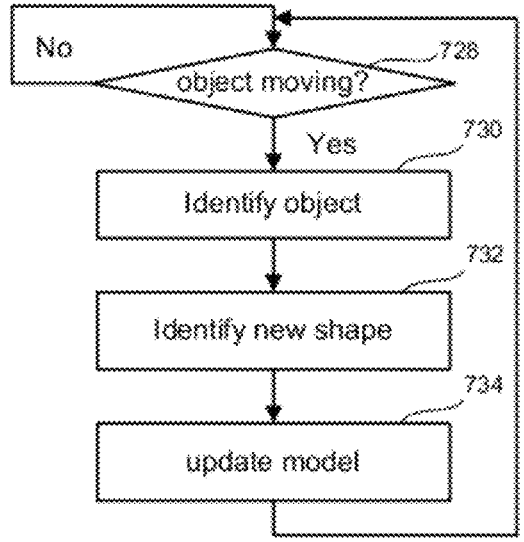
FIG. 11A is a flow chart describing one embodiment of a process for updating the model in response to a moving object.

FIG. 11A is a flow chart describing one embodiment of a process for updating the model created by the process of FIG. 9 in response to moving objects (e.g., a moving person or other type of object). In step 728, the system determines that an object is moving. For example, the system will continuously receive depth images. If the depth images change over time, then an object is moving. If no moving object is detected, then the system will continue to receive depth images and continue to look for moving objects.

If there is a moving object, then in step 730 the system will identify the object that is moving. Frame differencing or any of various tracking technologies can be used to recognize the moving object and correlate the recognized object to one of the objects identified in step 608 of FIG. 8. Some objects will change shape when moving. For example, a human may change shape as the human walks or runs, In step 732, the new shape of the moving object is identified and stored. In step 734, the model of the environment that was previously created is updated based on the new position and shape of the moving object. The process of FIG. 11A can be performed by processing unit 4 of hub computing device 12.

FIG. 12 is a flowchart describing one embodiment of a process for projecting (or otherwise displaying) virtual objects over real objects. For example, the process of FIG. 12 is one example implementation of step 610 of FIG. 8. In one embodiment, the process of FIG. 12 is performed by processing unit 4. In step 750 of FIG. 12, the system accesses the model of the environment. In step 752, the system determine the point of view of the user with respect to the model of the environment. That is, the system determines what portion of the environment or space the user is look at. In one embodiment, step 752 is a collaborative effort using hub computing device 12, processing unit 4 and head mounted display device 2. In one example implementation, hub computing device 12 will track the user and head mounted display device in order to provide a preliminary determination of location and orientation of head mounted display device 2. Sensors on the head mounted display device 2 will be used to refine the determined orientation. For example, the inertial sensors 34, described above, can be used to refine the orientation of head mounted display device 2. Additionally, the eye tracking process described above can be used to identify a subset the initially determined field of view that corresponds to where the particular a user is looking at. More details will be described below with respect to FIGS. 13, 14 and 15.

In one embodiment, the system will attempt to add multiple virtual images into a scene. In other embodiments, the system may only attempt to insert one virtual image into the scene. For a virtual image, the system has a target of where to insert the virtual image. In one embodiment, the target could be a real world object, such that the virtual image will replace the view of the real object. In other embodiments, the target for the virtual image can be in relation to a real world object.

In step 754, the system renders the previously created three dimensional model of the environment from the point of view of the user of head mounted display device 2 in a z-buffer, without rendering any color information into the corresponding color buffer. This effectively leaves the rendered image of the environment to be all black, but does store the z (depth) data for the objects in the environment. Step 754 results in a depth value being stored for each pixel (or for a subset of pixels). In step 756, virtual content (e.g., virtual images corresponding to virtual objects) is rendered into the same z-buffer and the color information for the virtual content is written into the corresponding color buffer. This effectively allows the virtual images to be drawn on the microdisplay 120 with taking into account real world objects or other virtual objects occluding all or part of a virtual object.

In step 758, virtual objects being drawn over moving objects are blurred just enough to give the appearance of motion. In step 760, the system identifies the pixels of microdisplay 120 that display virtual images. In step 762, alpha values are determined for the pixels of microdisplay 120. In traditional chroma key systems, the alpha value indicates how much of an The alpha value is used to identify how opaque an image is, on a pixel-by-pixel basis. In some applications, the alpha value can be binary (e.g., on or off). In other applications, the alpha value can be a number with a range. In one example, each pixel identifies in step 760 will have a first alpha value and all other pixels will have a second alpha value.

In step 764, the pixels of the opacity filter are determined based on the alpha values. In one example, the opacity filter has the same resolution as microdisplay 120 and, therefore, the opacity filter can be controlled using the alpha values. In another embodiment, the opacity filter has a different resolution than microdisplay 120 and, therefore, the data used to darken or not darken the opacity filter will be derived from the alpha value by using any of various mathematical algorithms for converting between resolutions. Other means for deriving the control data for the opacity filter based on the alpha values (or other data) can also be used.

In step 766, the images in the z-buffer and color buffer, as well as the alpha values and the control data for the opacity filter, is adjusted to account for light sources (virtual or real) and shadows (virtual or real). More details of step 766 are provided below with respect to FIG. 12A. In step 768, the composite image based on the z-buffer and color buffer is sent to microdisplay 120. That is the virtual image is sent to microdisplay 120 to be displayed at the appropriate pixels, accounting for perspective and occlusions. In step 770, the control data for the opacity filter is transmitted from processing unit 4 to head mounted display device 2 to control opacity filter 114. Note that the process of FIG. 12 can be performed many times per second (e.g., the refresh rate).

The process of FIG. 12 allows for automatically displaying a virtual image over a stationary or moving object (or in relation to a stationary or moving object) on a display that allows actual direct viewing of at least a portion of the space through the display.

FIG. 12A is a flowchart describing one embodiment of a process for accounting for light sources and shadows, which is an example implementation of step 766 of FIG. 12. In step 780, processing unit 4 identifies one or more light sources that need to be accounted. For example, a real light source may need to be accounted for when drawing a virtual image. If the system is adding a virtual light source to the user's view, then the effect of that virtual light source can be accounted for in the head mounted display device 2. In step 782, the portions of the model (including virtual images) that are illuminated by the light source are identified. In step 784, an image depicting the illumination is added to the color buffer described above.

In step 786, processing unit 4 identifies one or more areas of shadow that need to be added by the head mounted display device 2. For example, if a virtual image is added to an area in a shadow, then the shadow needs to be accounted for when drawing the virtual image by adjusting the color buffer in step 788. If a virtual shadow is to be added where there is no virtual image, then the pixels of opacity filter 114 that correspond to the location of the virtual shadow are darkened in step 790.

FIG. 15 is a flowchart describing one embodiment of a process for determining the point of view a user, which is an example implementation of step 752 of FIG. 12. The process of FIG. 15 relies on information from the hub computing device 12 and the eye tracking technology described above. FIG. 13 is a flowchart describing one embodiment of a process performed by the hub computing system to provide tracking information used in the process of FIG. 15. FIG. 14 is a flowchart describing one embodiment of a process for tracking an eye, the results of which are used by the process of FIG. 15.

In step 810 of FIG. 13, hub computing device will track the user's position. For example, hub computing device 12 will use one or more depth images and one or more visual images to track a user (e.g., using skeleton tracking). One or more depth images and one or more visual images can be used to determined the position of the head mounted display device 2 and the orientation of the head mounted display device 2 in step 812. In step 814, the position and orientation of the user and the head mounted display device 2 are transmitted from the hub computing device 12 to processing unit 4. In step 816, the position and orientation information is received at processing unit 4.

FIG. 14 is a flowchart describing one embodiment for tracking an eye using the technology described above. In step 860, the eye is illuminated. For example, the eye can be illuminated using infrared light from eye tracking illumination 134A. In step 862, the reflection from the eye is detected using one or more eye tracking cameras 134B. In step 864, the reflection data is sent from head mounted display device 2 to processing unit 4. In step 866, processing unit 4 will determine the position of the eye based on the reflection data, as discussed above.

FIG. 15 is a flowchart describing one embodiment of a process for determining the point of view (e.g., step 750 of FIG. 12). In step 902, processing unit 4 will access the latest position and orientation information received from the hub. The process of FIG. 13 can be performed continuously as depicted by the arrow from step 814 to step 810, therefore, processing unit 4 will periodically receive updated position and orientation information from hub computing device 12. However, processing unit 4 will need to draw the virtual image more frequently than it receives the updated information from hub computing device 12. Therefore, processing unit 4 will need to rely on information sensed locally (e.g., from the head mounted device 2) to provide updates to the orientation in between samples from hub computing device 12. In step 904, processing unit 4 will access data from three axis gyro 132B. In step 906, processing unit 4 will access data from three axis accelerometer 132C. In step 908, processing unit 4 will access data from three axis magnetometer 132A. In step 910, processing unit 4 will refine (or otherwise update), the position and orientation data from hub computing device 12 with the data from the gyro, accelerometer and magnetometer. In step 912, processing unit 4 will determine the potential point of view based on the location and orientation of head mounted display device. In step 914, processing unit 4 will access the latest eye position information. In step 916, processing unit 4 will determine portion of model being viewed by user, as a subset of the potential point of view, based on eye position. For example, the user may be facing a wall and, therefore, the field of the view for the head mounted display could include anywhere along the wall. However, if the user's eyes are pointed to the right, then step 916 will conclude that the field of view of the user is only the right hand portion of the wall. At the conclusion of step 915, processing unit 4 has determined the point of view of the user through head mounted display 2. Then, as described above with respect to FIG. 12, processing unit 4 can identify a location within that field of view to insert a virtual image and block light using the opacity filter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for fusing virtual content into real content, comprising:
   creating a volumetric model of a space;
   segmenting the model into objects, the segmenting the model into objects includes accessing one or more depth images and accessing one or more visual images, the segmenting the model into objects includes detecting one or more persons using the one or more depth images and the one or more visual images, the segmenting the model into objects includes detecting edges based on the one or more depth images and the one or more visual images, the segmenting the model into objects includes detecting the objects based on the edges and updating the model to store information about the detection of the objects and the one or more persons;
   identifying one or more of the objects including a first object, the identifying one or more of the objects includes matching at least one of the detected objects to a user identity and accessing a data structure of shapes, the identifying one or more of the objects includes matching one or more of the detected objects to shapes in the data structure and updating the model to reflect the matching of the at least one of the detected objects to the user identity and the matching of the one or more of the detected objects to shapes in the data structure, the identifying one or more of the objects includes visually displaying an unmatched object to a user of a display and requesting the user to identify the unmatched object, the identifying one or more of the objects includes receiving a new identification for the unmatched object and updating the data structure to reflect the new identification, the identifying one or more of the objects includes updating the model to store information about the new identification for the unmatched object; and
   automatically displaying a virtual image over the first object on the display that allows actual direct viewing of at least a portion of the space through the display.

2. The method of claim 1, wherein the creating a volumetric model comprises:
   receiving depth images from multiple perspectives; and
   using data from the depth images to create and store a three dimensional description of the space.

3. The method of claim 1, further comprising:
   specifying that the first object is to be replaced; and
   identifying the virtual image to replace the first object.

4. The method of claim 1, wherein the automatically displaying the virtual image over the first object further comprises:
   identifying a light source; and
   adjusting the virtual image based on the light source.

5. The method of claim 1, wherein the automatically displaying the virtual image over the first object further comprises:
   identifying a shadow area; and
   darkening a view of a real object corresponding to the shadow area.

6. The method of claim 1, wherein:
   the automatically displaying the virtual image over the first object on the display comprises determining a point of view of the user of the display, the determining field point of view of the user of the display comprises automatically determining location and orientation of the display using the one or more depth images, automatically refining the determined orientation of the display using inertial sensors and automatically determining position of an eye of the user of the display to identify a subset of the space viewed at the determined location and orientation.

7. The method of claim 1, wherein the displaying of the virtual image over the first object on the display further comprises:
   automatically determining that the first object is moving;
   automatically tracking movement of the first object;
   automatically determining a change in shape of the first object; and
   blurring the virtual image in response to movement of the first object.

8. The method of claim 1, wherein the displaying of the virtual image over the first object on the display further comprises:
   identifying a portion of the display that shows the first object; and selectively blocking light from passing through the portion of the display that shows the first object, the virtual image is projected on the portion of the display that shows the first object.

9. The method of claim 1, wherein:

the automatically displaying the virtual image includes projecting the virtual image on the display without projecting the portion of the space on the display; and the first object is a portion of a person.

10. The method of claim 1, wherein: the display comprises a head-mounted display.

* * * * *